March 1, 1938.  A. NEVELING, SR  2,109,680
SEALING DEVICE FOR PUMPS
Filed April 13, 1936  2 Sheets-Sheet 1
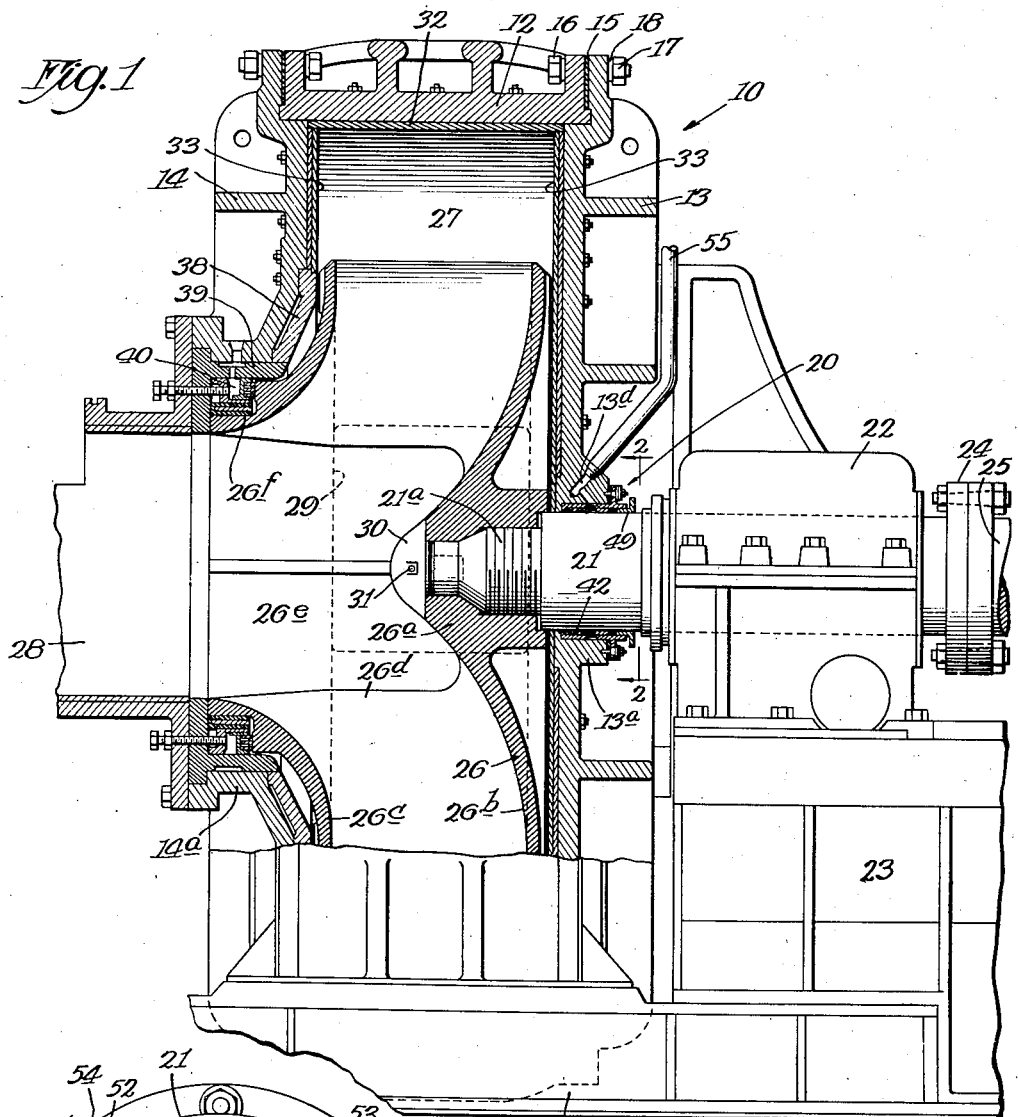
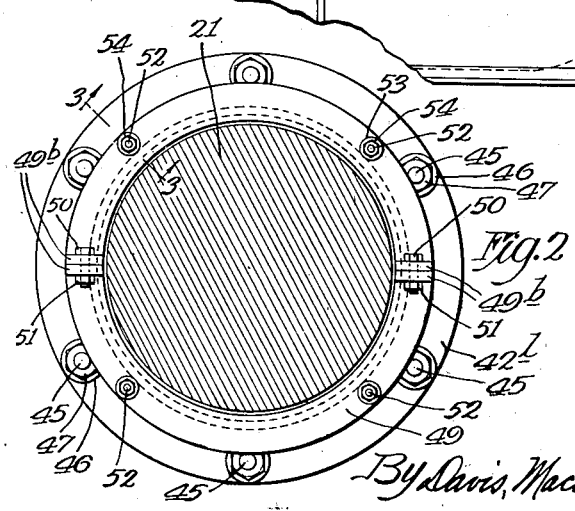
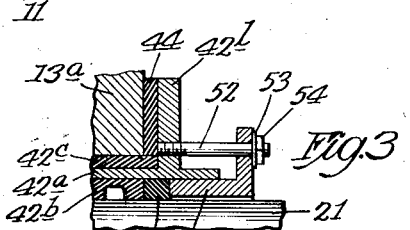
Inventor:
Aloys Neveling, Sen.
By Davis, Macauley, May, Lindsey & Smith Attys.

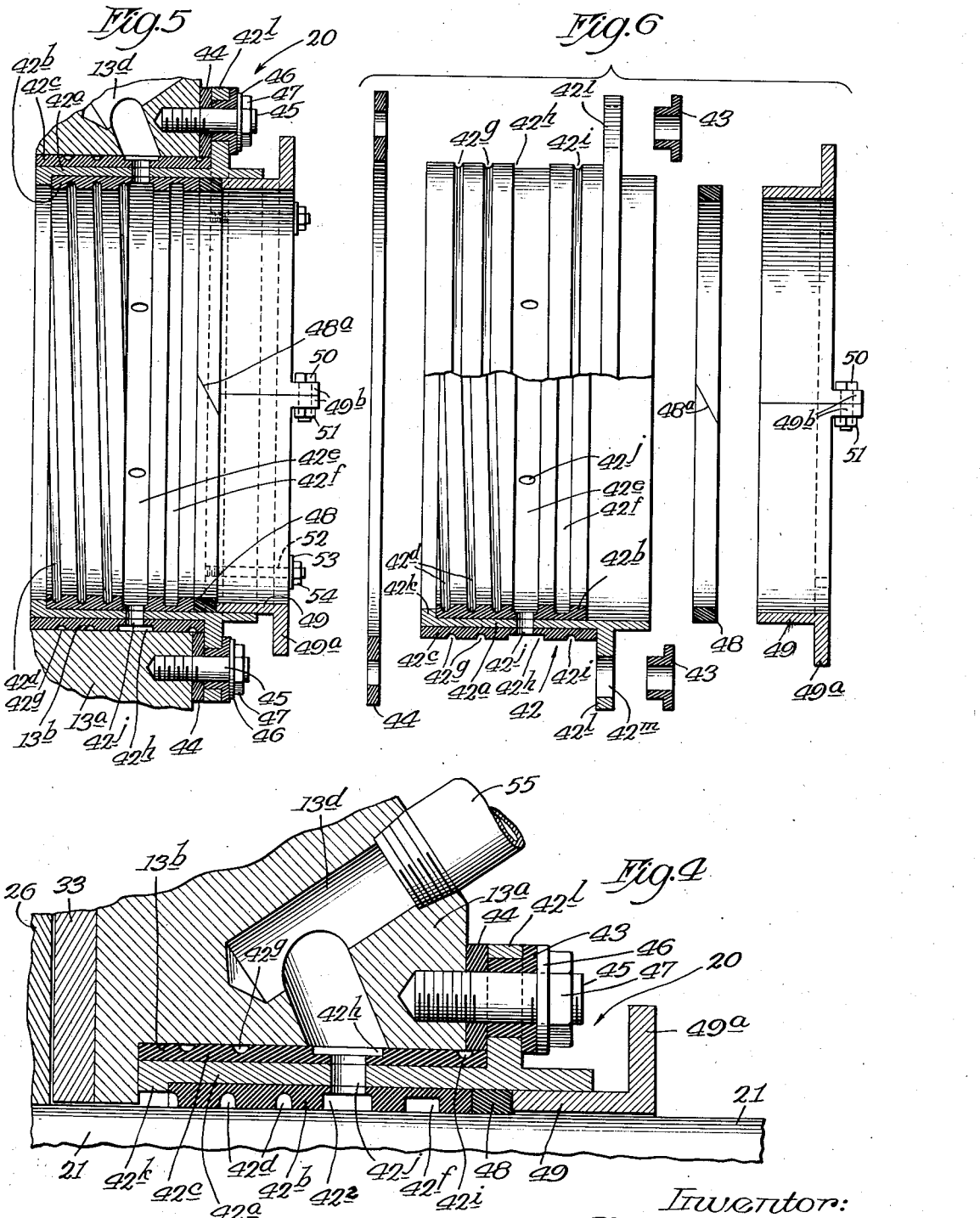

Patented Mar. 1, 1938

2,109,680

UNITED STATES PATENT OFFICE 2,109,680

SEALING DEVICE FOR PUMPS

Aloys Neveling, Sr., Chicago, Ill.

Application April 13, 1936, Serial No. 74,015

4 Claims. (Cl. 308—36.1)

This invention relates to improvements in sealing devices for rotary pumps and the like and its purpose is to provide an improved device which may be employed to provide a substantially fluid-tight seal about a rotating shaft or the like and a seal which will permit rotation of the shaft without excessive wear. Heretofore, great difficulty has been encountered in providing seals around rotatable shafts and the like, such as shafts which drive the runners or impellers of rotary pumps. The presence of sand and other finely divided matter in the material being pumped has caused rapid wear on parts of the pump with which the material being pumped comes in contact and particularly on the surfaces of relatively movable parts, such as bearings and the like. The principal object of the present invention is to provide an improved bearing for the rotatable shaft of a pump or the like comprising means for preventing excessive wear and for keeping the solid materials of the material being pumped out of contact with the pump shaft and its bearing. A further object of the invention is to provide a water lubricated bearing for pump shafts and the like comprising parts adapted to prevent excessive wear. Another object is to provide a rubber bearing for a pump shaft or the like in combination with means for lubricating the bearing by means of water under pressure which operates to keep the bearings free of solid materials passing through the pump chamber. Another object is to provide a lubricated sealing device comprising complementary parts of metal and rubber which may be readily assembled and readily replaced. Other objects of the invention relate to various features of construction and arrangement which will appear more fully hereinafter.

The nature of the invention will be understood from the following specification taken with the accompanying drawings in which one embodiment is illustrated.

In the drawings,—

Figure 1 shows a partial central vertical section and partial side elevation of a rotary pump having embodied therein the improved sealing device of the present invention;

Fig. 2 shows an enlarged vertical section taken on the line 2—2 of Fig. 1;

Fig. 3 shows an enlarged section taken on the line 3—3 of Fig. 2;

Fig. 4 is an enlarged axial section like that of Fig. 1 through the upper part of the sealing device of the present invention;

Fig. 5 shows an enlarged complete axial section through the sealing device of the present invention, the view being similar to that of Fig. 1, but on an enlarged scale; and Fig. 6 is a sectional view of the parts illustrated in Fig. 5 when they have been separated from each other.

The invention is illustrated in the accompanying drawings as being embodied in a rotary pump 10 which comprises a base 11 adapted to rest upon a suitable support and having mounted thereon the annular pump casing 12. This pump casing has a cylindrical chamber which is closed at one end by the rear head 13 and at the other end by the front head 14. Gaskets 15 are mounted between the flanges of the casing and the heads and these flanges are secured together by bolts 16 and nuts 17, there being washers 18 mounted between the heads of the bolts and the nuts and the adjacent flanges through which the bolts pass. The rear head 13 is provided with a central opening provided with a bearing or sealing device 20, constructed according to the present invention, and having rotatably mounted therein the pump shaft 21 which is journaled in an adjacent bearing 22 mounted upon the bearing base 23. The pump shaft 21 is connected by a suitable coupling device 24 with a driving shaft 25 adapted to be operated by a motor or the like. The inner end of the shaft 21 is threaded as shown at 21ª and this part engages the internally threaded hub 26ª of the rotor or runner 26 of the pump which is adapted to rotate within the chamber 27 of the pump casing and to draw in the materials to be pumped through the intake conduit 28 which is secured to the hub portion 14ª of the front head 14. The runner 26 comprises a rear wall 26ᵇ and a front wall 26ᶜ between which are mounted the radiating curved vanes or blades 26ᵈ of the pump. These blades are directed outwardly from a central opening 26ᵉ into which the materials being pumped pass from the intake conduit 28. After being discharged from the spaces between the blades or vanes of the pump runners, the materials being pumped are directed outwardly to a discharge opening indicated at 29. The runner 26 is held in place on the end of the shaft 21 by a nut 30 having a dome-shaped head which is fixed on the threaded end of the shaft by a transverse pin 31.

The pump casing 12 is provided with an annular cylindrical liner 32 of hard material adapted to withstand the abrasion of the solid particles contained in the material being pumped. Other hard metal liners 33 are mounted to extend inwardly from the liner 32 on the inner faces of the heads 13 and 14. Hard metal plates 36 are secured to the rear head 13 within the ring 35 attached to that head to withstand the abrasion of materials which occupy the space between those plates and the adjacent runner. Within the liner 33 attached to the front head, is the annular front head liner 38 constructed to diverge outwardly from the inner edge of the suction mouth liner 39 which has a cylindrical portion fitting within the hub portion 14ᵃ of the front head. The liner 39 also has a radial flange which fits against the radial flange of the intake conduit 28. Within this radial flange of the liner 39, the front hub portion of the runner 26 is provided with a chamber 26ᶠ in which is mounted a sealing device 40 adapted to prevent injury to the adjacent parts of the liner and the rotating runner by solid materials contained in the material being pumped which have a tendency to be drawn by suction from the space around the runner through the passages between the runner and the front liner 38. This sealing device 40 forms the subject matter which is described and claimed in my copending application, Serial No. 74,014, filed April 13, 1936.

The present invention is directed primarily to the water sealing and bearing device 20 which is mounted in the rear head 13 about the runner shaft 21. As illustrated particularly in Figs. 3, 4, 5 and 6, this bearing and sealing device comprises a bearing member 42 which includes a metal sleeve 42ᵃ having vulcanized thereon an inner rubber sleeve 42ᵇ and an outer rubber sleeve 42ᶜ. The inner rubber sleeve 42ᵇ has formed in its inner surface a spiral groove 42ᵈ of semi-circular cross section and also two annular grooves 42ᵉ and 42ᶠ. The outer rubber sleeve 42ᶜ has formed therein two annular grooves 42ᵍ of semi-circular cross section and also two other grooves 42ʰ and 42ⁱ. The two grooves 42ᵉ and 42ʰ are of rectangular cross section and are located in registry with each other so that they communicate with apertures 42ʲ which are formed through the rubber sleeves and through the metal sleeve 42ᵃ. The metal sleeve 42ᵃ comprises an inwardly extending annular rib or shoulder 42ᵏ which engages the inner edge of the inner rubber sleeve 42ᵇ and this metal sleeve also has an outwardly extending annular flange 42ˡ which is provided at intervals around its circumference with apertures 42ᵐ adapted to be engaged by rubber bushings 43. A rubber ring 44 is mounted on the rubber sleeve 42ᶜ and seats against the inner face of the flange 42ˡ so that when the parts are assembled this ring 44 is interposed between the flange 42ˡ and the adjacent face of the hub portion 13ᵃ of the rear head of the casing. A series of studs 45 are mounted to extend through the bushings 43 and through apertures in the rubber ring 44 into threaded apertures which are formed in the hub 13ᵃ. Washers 46 are mounted on these studs and their outer threaded ends are engaged by nuts 47 by which the sleeve 42ᵃ and parts carried thereby are secured in position on the head.

A rubber gasket 48 which is split along an inclined surface 48ᵃ is mounted within the metal sleeve 42ᵃ and bears against the end of the inner rubber sleeve 42ᵇ. This gasket is of cylindrical form and is adapted to be compressed slightly by a gland 49 which is an annular member adapted to seat within the outer end of the metal sleeve 42ᵃ and bear against the outer edge of the gasket 48. This gland has an outwardly extending annular flange 49ᵃ and is formed in two parts which are secured together by bolts 50 and nuts 51, the bolts passing through apertures which are formed in ears 49ᵇ extending outwardly from the flange 49ᵃ. For the purpose of forcing the gland 49 inwardly to compress the gasket 48, the flange 49ᵃ of the gland is provided with apertures which are engaged by studs extending inwardly and having their inner threaded ends mounted in threaded apertures which are formed in the outwardly extending flange 42ˡ of the metal sleeve of the bearing member. These studs 52 are engaged at their outer ends by washers 53 and nuts 54 which may be adjusted inwardly to cause the compression of the gasket 48.

The bearing sleeve 42 is adapted to fit within a cylindrical bore 13ᵇ which is formed in the hub portion 13ᵃ of the rear head 13, as shown particularly in Fig. 4. When so mounted, the inner rubber sleeve 42ᵇ is adapted to fit the outer surface of the shaft 21 and the outer rubber sleeve 42ᶜ is adapted to fit the bore 13ᵇ in the hub. This rubber sleeve 42ᶜ is adapted to form a fluid-tight seal between the metal sleeve 42ᵃ and the casing and also to provide a resilient mounting for the metal sleeve so that it will not be damaged in the event that heavy blows are imparted thereto on account of irregular motion of the shaft 21. The inner edges of the metal sleeve 42ᵃ and of the inner rubber sleeve 42ᵇ are adapted to fit against the annular surface at the inner end of the bore 13ᵇ, as shown in Fig. 4. The inner diameter of the gland 49 is slightly greater than the diameter of the shaft 21 so that a clearance remains around the shaft, but the gasket 48 is adapted to be compressed by the gland to fit closely the outer surface of the shaft. In order to prevent substantial leakage and, in particular, to prevent the material being pumped from entering the bearing around the shaft, means are provided for furnishing water, or other fluid, under pressure, to the surfaces of the bearing member. For this purpose, the hub 13ᵃ of the head is provided with an annular passage 13ᵈ into the outer end of which there is fitted the threaded extremity of a pipe 55 through which water or other liquids under pressure may be supplied. This water may have a moderate pressure, such as 90 pounds per square inch, for example, and it flows through the passage 13ᵇ and through the openings 42ʲ to the groove 42ᵉ which is formed in the inner rubber bearing member 42ᵇ. At the same time, the water is distributed circumferentially through the groove 42ʰ and eventually finds its way through the other grooves formed in the rubber sleeve so that this pure water under pressure occupies all of these grooves and forms a film which lubricates the shaft 21 within the rubber sleeve 42ᵇ. A small quantity of this water under pressure will flow outwardly through the gasket 48 and the remaining portion flows inwardly against the pressure of the materials contained within the casing of the pump so that these materials being pumped, which may contain solid matter, are prevented from passing outwardly into the bearings. In this way the life of the bearing is greatly increased because the shaft rotates freely in a rubber bearing member which is lubricated by pure water and the wearing effects of finely divided solid materials are avoided.

Although one form of the invention has been shown and described by way of illustration, it will be understood that it may be constructed in various other embodiments coming within the scope of the appended claims.

I claim:

1. The combination in a pump, of a casing having a head, said head having an aperture therethrough and a bearing chamber around said aperture, a shaft extending through said aperture, a bearing mounted in said chamber and comprising a metal sleeve having inner and outer rubber sleeves secured thereon, said outer sleeve fitting said chamber, said inner sleeve engaging said shaft, said sleeves having registering grooves therein, said bearing having apertures providing a communication between said grooves, said head having a passage therethrough registering with said groove in said outer rubber sleeve, and means for supplying water under pressure to said passage.

2. The combination in a pump, of a casing having a head, said head having an aperture therethrough and a bearing chamber around said aperture, a shaft extending through said aperture, a bearing mounted in said chamber and comprising a metal sleeve having inner and outer rubber sleeves secured thereon, said outer sleeve fitting said chamber, said inner sleeve engaging said shaft, said sleeves having registering grooves therein, said bearing having apertures providing a communication between said grooves, said head having a passage therethrough registering with said groove in said outer rubber sleeve, and means for supplying water under pressure to said passage, said inner rubber sleeve having grooves therein around said shaft to distribute the water received from said first named grooves.

3. The combination in a pump, of a casing having a head, said head having an aperture therethrough, a shaft extending through said aperture, a metal sleeve surrounding said shaft and having an outer rubber sleeve secured thereto to fit within said aperture and having an inner rubber sleeve secured thereto to fit around said shaft, and means for securing said metal sleeve to said head.

4. The combination in a pump, of a casing having a head, said head having an aperture therethrough, a shaft extending through said aperture, a metal sleeve surrounding said shaft and having an outer rubber sleeve secured thereto to fit within said aperture and having an inner rubber sleeve secured thereto to fit around said shaft, said metal sleeve having an inwardly extending flange at its inner end to engage the inner end of said inner rubber sleeve, an annular rubber gasket engaging the outer end of said inner rubber sleeve, a metal gland fitting within the outer end of said metal sleeve and bearing against said gasket and adjustable means connecting said gland with said metal sleeve for causing said gland to compress said gasket.

ALOYS NEVELING, Sr.